United States Patent
Davydov (10) Patent No.: US 6,456,434 B1
(45) Date of Patent: Sep. 24, 2002

(54) SINGLE CRYSTAL TWO-BEAM POLARIZING PRISM WITHOUT ANGULAR DISPERSION AND METHOD OF MANUFACTURING THEREOF

(75) Inventor: Boris Davydov, Moscow Region (RU)

(73) Assignee: Solid Optics Inc., Palo Alto, CA (US)

( * ) Notice: Subject to any disclaimer, the term of this patent is extended or adjusted under 35 U.S.C. 154(b) by 0 days.

(21) Appl. No.: 09/875,230

(22) Filed: Jun. 5, 2001

(51) Int. Cl.[7] .................................................. G02B 5/30
(52) U.S. Cl. ........................ 359/496; 359/495; 359/494; 359/900
(58) Field of Search ................................ 359/483, 485, 359/494, 900, 495, 496, 831, 833, 834, 835, 836, 837

(56) References Cited

U.S. PATENT DOCUMENTS

| | | | | |
|---|---|---|---|---|
| 4,571,030 A | * | 2/1986 | Fountain | ................ 219/121.13 |
| 5,408,491 A | * | 4/1995 | Hirai et al. | .................. 359/484 |
| 5,557,692 A | * | 9/1996 | Pan et al. | .................... 359/484 |
| 5,822,118 A | * | 10/1998 | Bergmann | .................. 359/495 |
| 6,177,995 B1 | * | 1/2001 | Compain et al. | ........... 356/366 |

* cited by examiner

*Primary Examiner*—Cassandra Spyrou
*Assistant Examiner*—John Juba, Jr.
(74) *Attorney, Agent, or Firm*—Schwegman, Lundberg, Woessner & Kluth, P.A.

(57) ABSTRACT

A single-crystal polygonal polarization prism has at least two pairs of mutually parallel prism planes. The prism is characterized by the fact that the e-beam is reflected within the prism with even number of reflections, whereby after the exit from the prism the angular position of the e-beam does not depend on the wavelength. The o-beam is subjected to at least one reflection, and the angular position of o-beam also does not depend on the wavelength. The prism of the invention does not distort the cross sections of the beams and is characterized by minimal optical losses.

14 Claims, 6 Drawing Sheets

SINGLE CRYSTAL TWO-BEAM POLARIZING PRISM WITHOUT ANGULAR DISPERSION AND METHOD OF MANUFACTURING THEREOF

FIELD OF INVENTION

The present invention relates to the field of optics, in particular, to optical devices for spatially separating or combining orthogonally polarized optical beams, in particular, to optical devices used as optical beam polarizers or analyzers in the optics of ultraviolet, visible, and infrared radiation, including laser emission. More specifically, the invention relates to birefringent polarizing two-beam prisms.

BACKGROUND OF THE INVENTION

According to commonly accepted rule, orientation of the light-wave electric field determines its polarization direction, and the plane of the electric vector and the light propagation direction are referred to as a polarization plane. If electric field oscillations occur only in that plane, and the plane itself has a constant spatial position, such light is referred to as having linear or planar polarization (or simply polarized). If the wave electric vector rotates around the light propagation direction (i.e., around the wave vector), such light can have either elliptical or circular polarization. For nontonochromatic light, i.e., for one containing a number of frequency components, the temporal changes in the amplitude and spatial position of its resulting electric vector can be absolutely arbitrary, and such light is referred to as unpolarized.

Linearly polarized light beams have found general application in optics, laser engineering, technology, e.g., for precision processing of metals (cutting, drilling etc.), in photochemistry for resonance excitation of molecules and atoms, in biology for similar purposes, in communication engineering, etc. The preference is given to polarized light due to higher accuracy of interaction of such light with materials. Such high interaction accuracy results from the complexity and anisotropy in the inner structure of the aforementioned materials. For example, most of the devices widely used in optics and communication engineering for entering information into a light beam, such as electrooptical and acoustooptical modulators, operate with linearly polarized light because of the pronounced anisotropy of optical properties in the crystals these devices are based upon. Fiber optics communication engineering is a field where polarized light has a constantly increasing application. Anisotropic fibers for polarized light and low-noise polarization amplifiers have been developed. In principle, polarized radiation is used for effective transformation of laser frequencies in nonlinear crystals and for selection of optical radiation frequencies by anisotropic tunable acoustooptical and electrooptical filters. The use of polarized light is required for operation of binary polarization switchers/modulators, polarization multiplexers and, in general, in any optical devices for which anisotropic interaction of light with the materials is advantageous.

There are a number of devices that can be used for light polarization. These include dichroism dye based polarizers, purely crystalline polarizers, interference polarizers, polarizers based on isotropic materials that use the effects of light reflection and light refraction at the Brewster angle, etc.

However, special accent is made on prism-type polarizers that have a specific geometry and are made of optically anisotropic crystalline materials. The reason for making such accent is due to the special properties of these polarizers. As a rule, they are crystalline polarizers that exhibit high extinction (ratio of the useful and unnecessary orthogonally polarized light components) of polarized beams, low optical losses, and high resistance to high-power optical radiation, especially laser radiation.

For better understanding the principles of the present invention, it would be advantageous to briefly describe the structure of conventional polarizing prisms. The basics of polarizing devices are described, for example, in *Handbook of Optics, Vol. II, Devices Measurements and Properties*, McGraw-Hill, Inc., 1995, pp. 3.1–3.70, New York, San Francisco, Montreal, Tokyo, Toronto.

Polarizing prisms are made only of birefringent crystals that have no cubic crystal symmetry. In such crystals, the light is split into two orthogonally polarized beams which, upon exit from the crystal, are in general case spatially separated both with respect to the exit points and the propagation angles. However, for many reasons (small separation angles or distances, unavoidable frequency dispersion of the prism, reflection optical losses and technologically uncomfortable beam exiting geometry) simple single crystal prisms are replaced for combinations thereof that are referred to as polarizing prisms. Polarizing prisms are usually made of a relatively cheap and abundant calcite ($CaCO_3$). Recently a wide range of artificially grown birefringent crystals have been developed for polarizing prism applications. Such crystals are, for example, $TiO_2$, $YVO_4$, $KNbO_3$, $KTiOPO_4$, $\alpha$-$BaB_2O_4$, $PbMoO_4$, $TeO_2$, Te, Se, etc. However, the general use of these materials is precluded by their high cost, complexity of manufacturing compound prisms therefrom or insufficiently pronounced optical anisotropy (birefringence).

Advanced polarizing prisms usually contain two or more trihedral prisms made of optically uniaxial crystals of tetragonal, hexagonal, or trigonal symmetry having similar or different optical axis orientations and bonded to each other with transparent substances (cements) or separated from each other with a thin air or vacuum gap. Cement-free gaps are often used in prisms for short-wave radiation or high-power laser beams.

Prisms are subdivided into one-beam prisms, from which only one linearly polarized light beam exits, and two-beam prisms, that produce two light beams polarized in mutually perpendicular planes (orthogonally polarized beams). The former type prisms operate on the basis of the total internal reflection principle. A nonpolarized incident beam is split in the prism into two orthogonally polarized beams. One of these beams undergoes total internal reflection at the prism bounding and is deflected, while the other beam passes through the bounding for further use or processing. Such prisms are known as the Nicol, Glazebrook, Hartnack-Prazmowsky, Ahrens, etc., prisms. FIG. 1 shows some of these prisms. (a), (b) and (c) are Glan-type prisms known as the Glan-Thompson (a), Lippich (b) and Frank-Ritter (c) prisms. The second row in FIG. 1 shows Nicol-type prisms, i.e., the conventional Nicol prism (d), the Nicol-Halle form prism (e), and the Hartnack-Prazmowsky prism (f). The optical axes of the prisms are shown in with double arrows.

Variations in the structure of the prisms is normally accompanied by changes in the prisms' names. For example, the air-gap Glan-Thompson prisms are referred to as the Glan-Foucault prisms, and the air-gap Lippich prisms as the Glan-Taylor prisms. In practice, any of these prisms can be referred to as a Glan prism. The air-gap Nicol prisms are referred to as the Foucault prisms. There also are combinations of three bound prisms, the so-called "double" prisms. The double Glan-Thompson prisms are referred to as the Ahrens prisms.

FIG. 2 shows various types of two-beam polarizing prisms. The optical axes of the two parts of Rochon (a), Sénarmont (b), and Wollaston (c) prisms are perpendicular to each other. The Foster (d) and beam-splitting Glan-Thompson (e) prisms have parallel optical axes. In this respect these prisms are similar to one-beam polarizing prisms, but their shape is changed so the two beams propagate in specific directions without noticeable losses.

The need for the great variety of existing polarizing prisms (not all of them are shown here) stems from the impossibility of designing a prism having universal parameters. Each polarizing prism has its individual advantages and drawbacks that determine its applicability. Prisms are characterized by a number of parameters, such as angular separation of the beams and frequency dispersion of the aforementioned angular separation, angular aperture, extinction, spectral operation range, optical losses, resistance to high-power optical radiation and external thermal, humidity and mechanical impacts, entrance hole (geometrical aperture), linear sizes, durability, manufacturability and, of course, cost.

Example of one of the latest polarizing prism beam splitter is given in U.S. Pat. No. 6,018,048 issued on Jan. 25, 2000 to J. Pan et al. This splitter consists of a collimator and two similarly shaped birefringent crystal prisms. The light from the collimator is incident upon the first face of the first birefringent crystal prism, which also has second and third faces. In the first prism the collimated light that has passed along a normal to the first entrance face is incident onto the second face at a certain angle. The light component polarized perpendicular to the incidence plane is reflected without losses from the second face and is directed towards the third face of the first prism, while the light component polarized in the incidence plane is refracted to the second prism through the gap between the prisms. This thin gap is formed by parallel second faces of the prisms. The first (exit) face of the second prism is positioned relative to the second face of the second prism in exactly the same manner as the first face of the first prism is positioned relative to the second face of the first prism. As a result, the light that exits the second prism is refracted essentially along a normal to the first face of the second prism without cross-sectional distortions.

It is noteworthy that in all aforementioned combined polarizing prisms, including the one described in U.S. Pat. No. 6,018,418, separation of polarized beams occurs on the boundary between the two optical elements. This is important because, apart from beam splitting, optical losses occur due to fundamentally unavoidable Fresnel reflection and the cement material absorption on the boundary. As has been noted, the optical losses put limits upon the applicability of prisms in the UV range and high-power coherent laser engineering because the cement layer in the gap between the optical elements is frequently destroyed by such radiation. Vacuum and air gap prisms are used in the above applications, but in that case Fresnel losses increase due to the removal of immersion on the gap boundaries, thus the applicability of this design is limited. This problem could be solved by using very thin gaps with thicknesses on the order of wavelength, but in that case, apart from serious technological difficulties, optical losses in the reflected beam would grow unavoidably. This will occur due to the penetration/ tunneling of this beam through the gap, which effect would unavoidably impair the forward beam extinction ratio. Depending on prism design, such losses may be as high as 10%.

Another disadvantage of multicomponent prisms is their complex and troublesome technology. In their manufacturing it is necessary to provide high optical quality on cemented surfaces, exact mutual orientation of the crystal prisms, high-quality cementing without inclusions, and uniform gap thickness. It is also necessary to take into account anisotropic thermal expansion in the prism components, especially in case of different optical axis orientations, choose an appropriate cementing composition, etc.

An essential disadvantage of all known polarizing prism, including the one described in U.S. Pat. No. 6,018,418, is that they have unavoidable dispersion in the angular special positions of at least one of the polarized beams. This is because in composite prisms the separation of polarized beams into two separate beams occurs on the boundary of prism components at relatively large incident angles. Such separation is always accompanied by variations which occur in a beam separation angle between the polarized beams and which depends on the light wavelength.

The applicant has developed an anizotropic single-crystal polarizing prism for separation of a non-polarized beam into two orthogonally-polarized beams with minimal optical losses. This prism is described in detail in my earlier pending U.S. patent application Ser. No. 09/844,906 filed on Apr. 27, 2001 and its disclosure is incorporated by reference herein in its entirety. The aforementioned prism has a tetrahedral shape and is formed by four base planes having a predetermined angular orientation with respect to each other so that one of the polarized beams exists the prism at a Brewster angle by being refracted on the third base plane, while the second beam is reflected from the third base plane with total internal reflection and exits the prism through the fourth base plane in the normal direction thereto.

Figure 1A:
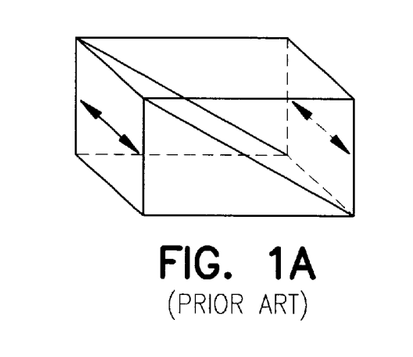
FIG. 1 is a three-dimensional view of known one-beam polarizing prisms.
Figure 1B:
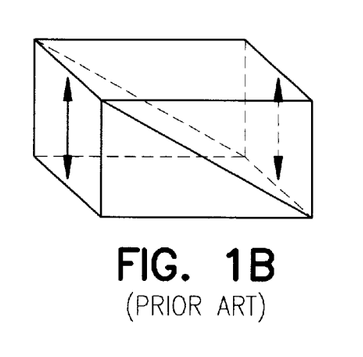
Figure 1C:
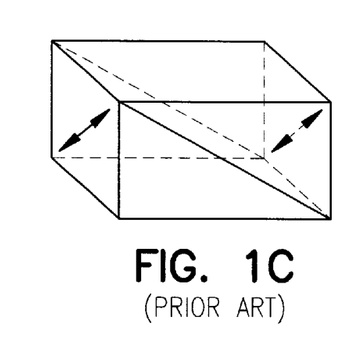
Figure 1D:
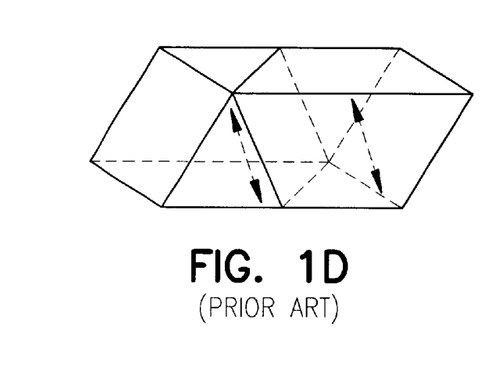
Figure 1E:
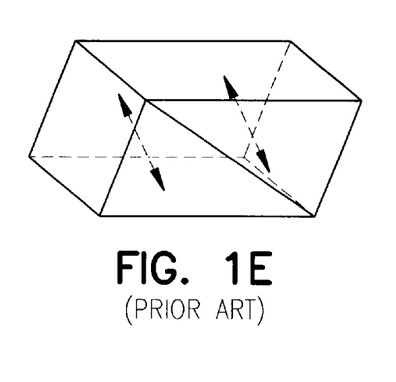
Figure 1F:
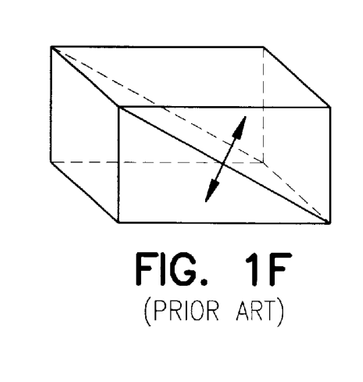
Figure 2A:
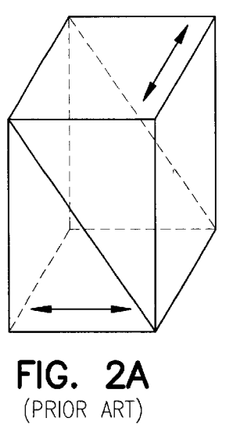
FIG. 2 is a three-dimensional view of known two-beam polarizing prisms.
Figure 2B:
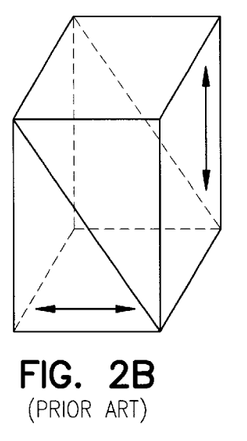
Figure 2C:
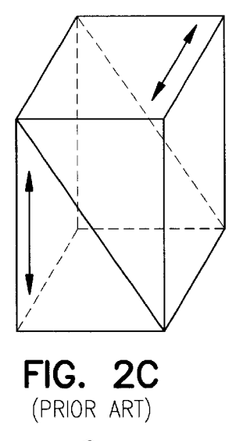
Figure 2D:
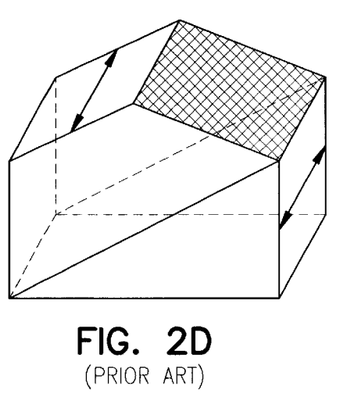
Figure 2E:
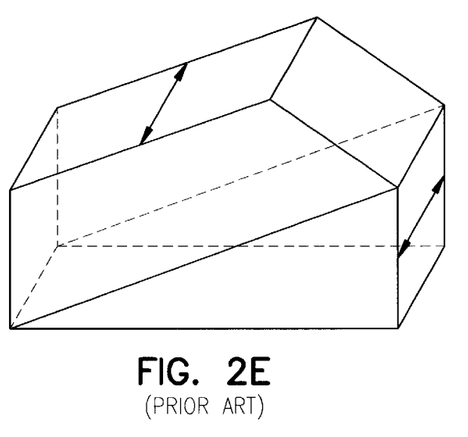
Figure 3:
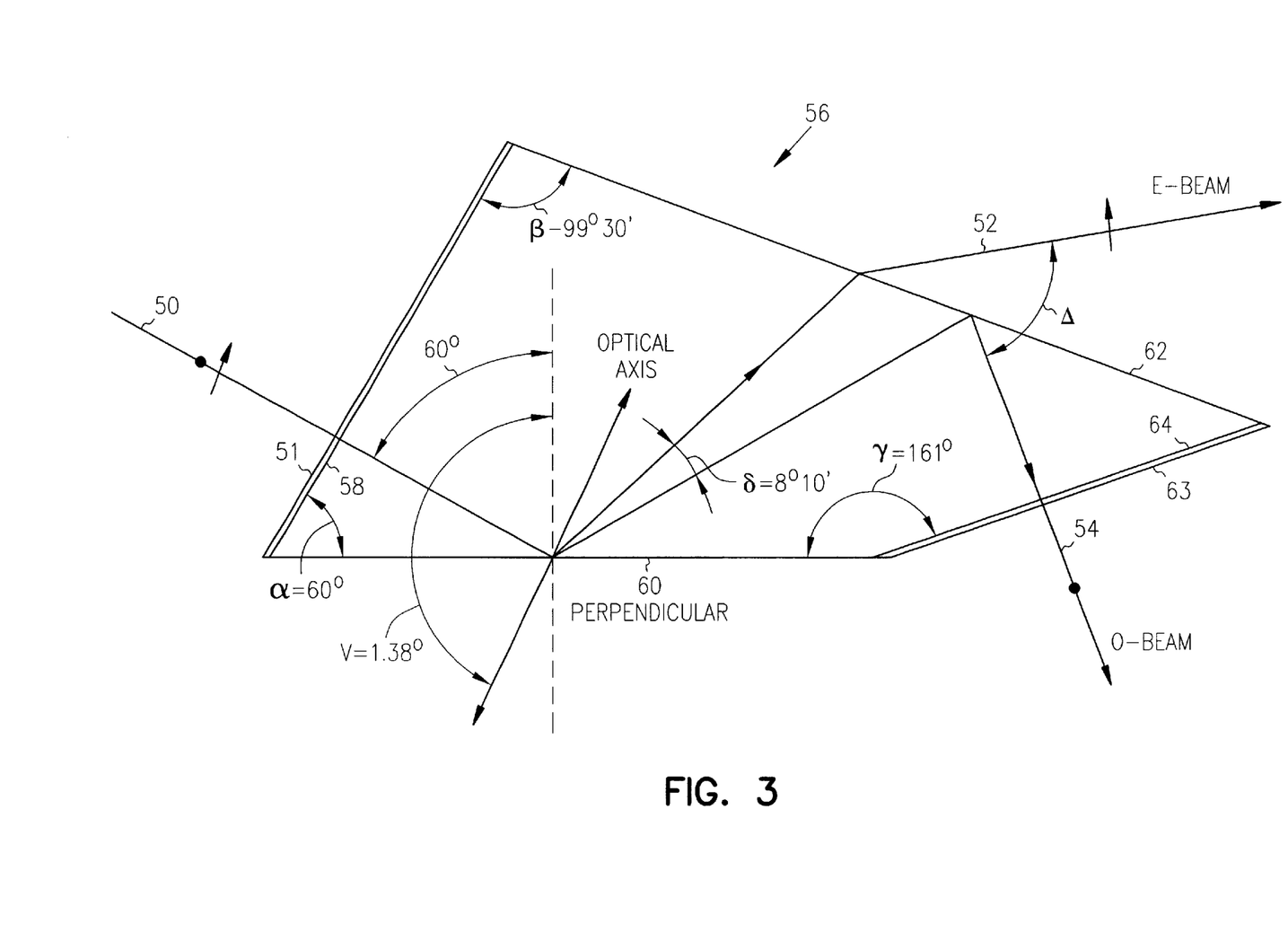
FIG. 3 is a longitudinal sectional view of a known single-crystal polarizing calcite prism.

The prism of U.S. patent application Ser. No. 09/844,906 is shown in FIG. 3, which is a longitudinal sectional view of the prism with illustration of path of the beams. This prism, which in general is designated by reference numeral 56, is made of a uniaxial or a biaxial crystal. Let us assume, for simplification of description, that it is made of a uniaxial crystal, such as calcite ($CaCO_3$). As can be seen from FIG. 3, the prism comprises a four-sided polygon and has four base planes, i.e., a first base plane 58, a second base plane 60 forming an angle $\alpha$ with the first base plane 58, a third base plane 62 located opposite to the second base plane 60 and forming an angle $\beta$ with the first base plane 58, and a fourth base plane 64 located opposite to the first base plane 58 and forming an angle $\gamma$ with the second base plane 60. It is important to note that all four angles of the prism differ from each other and all base planes, i.e., all side of the four-sided polygon, are not parallel. At least the first base plane 58, through which the non-polarized beam 50 enter the prism, and the fourth base plane 64, through which one of the polarized beams (which is described later) leaves the prism, are coated with antireflective interference coatings 51 and 53 shown on FIG. 3.

The entrance beam 50 enters the prism 56 of FIG. 3 through the first base plane 58 along the normal to this plane. The incident beam 50 reaches the second base plane 60 and is reflected therefrom towards the third base plane 62 in the form of two orthogonally-polarized beams, i.e., an e-beam 52 and an o-beam 54. In order to provide minimal optical losses, in the prism 56 of the type described in the aforementioned patent application, the e-beam 52 exits the prism 56 through the third base plane 62 with the Brewster refraction. At the same time, the o-beam 54 is reflected from the third base plane 62 with full internal reflection, which also is a criterion required for minimization of optical losses, and exits the prism 56 via the fourth base plane 64 along the normal to this plane.

It should be noted that the prism 56 of the type described in the aforementioned U.S. patent application Ser. No. 09/844,906 was developed for the purpose of obtaining a single-crystal polarizing beam splitter that provides a large beam separation angle with minimization of optical losses without the use of multicomponent optical devices such as composite prisms. This objective was successfully accomplished. Furthermore, it has been found that along with reduced optical losses, the aforementioned prism is characterized by reduced wavelength dispersion of the beam separation angle in air. In FIG. 3 this angle is shown as angle Δ. The aforementioned reduction in the wavelength dispersion is achieved due to the fact that dispersions of the reflection angle of the e-beam and of the Brewster refraction angle in air are opposite in signs and therefore are mutually subtracted. The resulting dispersion can even be reduced to zero by adjusting the angle of incidence and deviation from the Brewster angle. However, the such a decrease in dispersion is achieved at the expense of increase in optical losses.

Another disadvantage of the prism 56 is a small anamorphism inherent in e-beam in air at arbitrary choice of the beam incidence angles. In other words, the beam is slightly compressed in the incidence/refraction plane.

OBJECT OF THE INVENTION

It is an object of the invention is to provide a single-crystal two-beam polarization prism which is free of wavelength dispersion of the beam separation angle in air. Another object is to provide a prism of the aforementioned type through which the beams pass without distortion if their cross sections. Another object is to provide a prism of the aforementioned type which combines the aforementioned features with minimal optical losses. Another object is to provide a method of manufacturing the aforementioned a single-crystal two-beam polarization prism of the invention.

SUMMARY OF THE INVENTION

A single-crystal polygonal polarization prism has at least two pairs of mutually parallel prism planes. The prism is characterized by the fact that the e-beam is reflected within the prism with even number of reflections, whereby after the exit from the prism the angular position of the e-beam does not depend on the wavelength. The o-beam is subjected to at least one reflection, and the angular position of o-beam also does not depend on the wavelength. The prism of the invention does not distort the cross sections of the beams and is characterized by minimal optical losses. The prism has minimal possible geometrical dimensions.

DETAILED DESCRIPTION OF THE INVENTION

The invention is based on the well-known principle that in a prism, having at least one pair of mutually parallel prism planes in which the beams experience an even number of total internal reflections and exit the prism along normals to the beam-exiting planes, the angular position of the exiting beams do not depend on the wavelength of the incident beam light.

In anisotropic prisms the aforementioned statement is true for all orthogonally polarized beams.

Figure 4:
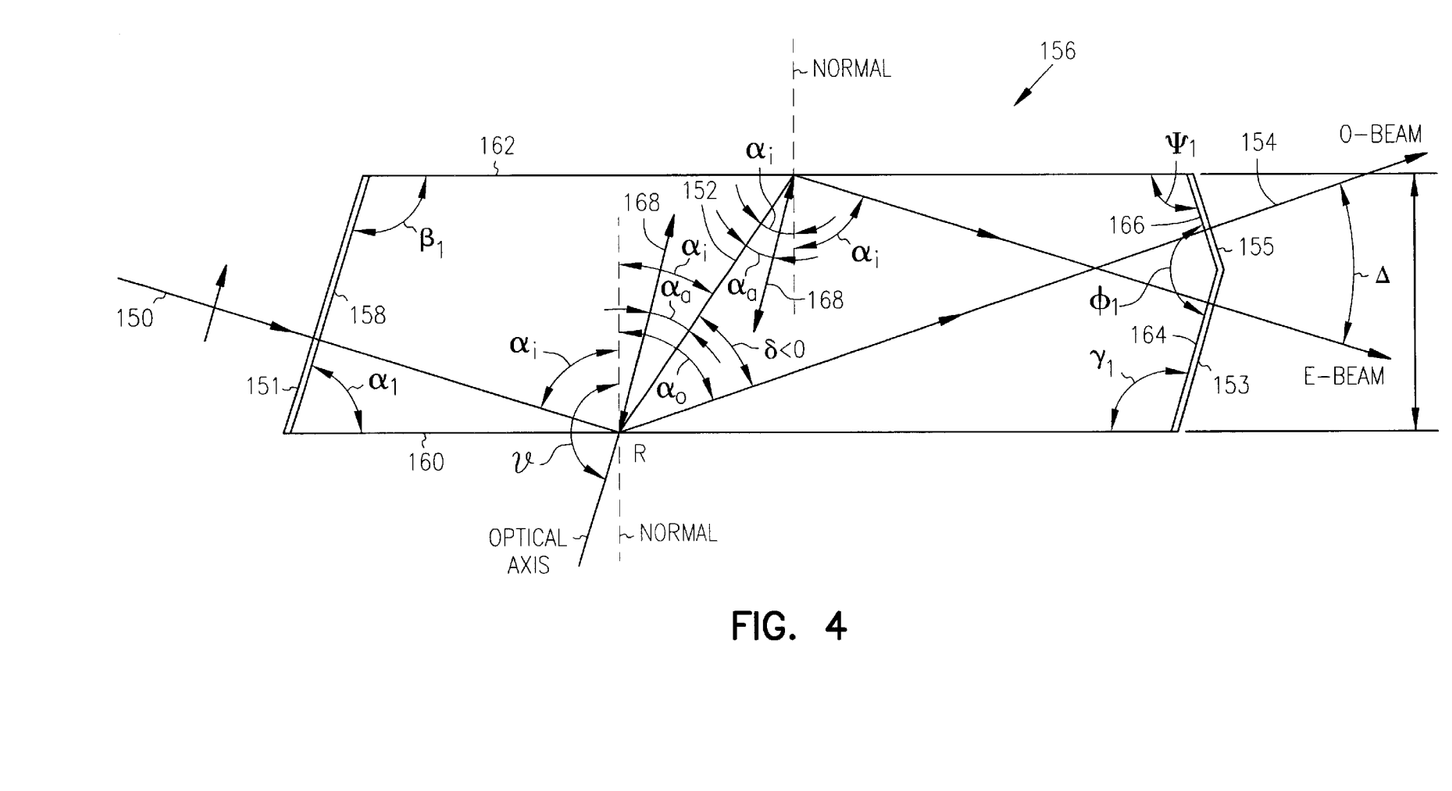
FIG. 4 is a longitudinal sectional view of a single-crystal polarizing calcite prism of the present invention.

The prism of the invention is shown in FIG. 4, which is a longitudinal sectional view of the prism with simplified illustration of path of the beams. This prism, which in general is designated by reference numeral 156, is made of a uniaxial or a biaxial crystal. Let us assume, for simplification of description, that it is made of a uniaxial crystal, such as calcite ($CaCO_3$). As can be seen from FIG. 4, the prism comprises a five-sided polygon and has five base planes, i.e., a first base plane 158, a second base plane 160 forming an angle $\alpha_l$ with the first base plane 158, a third base plane 162 located opposite to the second base plane 160 parallel thereto and forming an angle $\beta_1$, with the first base plane 158, and a fourth base plane 164 located opposite to the first base plane 158 parallel thereto and forming an angle $\gamma_1$ with the second base plane 160. The angle $\gamma_l$ is equal to the angle $\beta_1$. The prism also has a fifth base plane 166 which is located opposite the angle $\alpha_1$ between the third base plane 162 and the fourth base plane 164. The fifth base plane 166 form an angle $\psi_1$. with the third base plane 162. An angle $\phi_1$ between the fourth base plane 164 and the fifth base plane 166 is calculated from a known geometrical relations between the angles of a five-sided polygon, i.e., 540°−($\alpha_1$+$\beta_1$+$\gamma_1$+$\psi_1$). Symbol "h" designates the height of the prism "h". The prism thickness (not shown) is the dimension of the prism in the direction perpendicular to the plan of the drawing. The thickness should not be less than the dimension of the beam in the same direction. Reference numeral 151, 153, and 155 designate antireflective coatings on the first base plane 158, the fourth base plane 164, and the fifth base 166, respectively. In the attached drawings, positions of the optical axes in the prism crystal are shown by double-sided arrows.

The prism of the invention operates in the manner described below.

The non-polarized entrance beam 150 enters the prism 156 of FIG. 4 through the first base plane 158 along its normal and falls onto the second base plane 160 in a point R. Strictly speaking, after entering the anisotropic prism 156 the non-polarized beam is divided into two orthogonally polarized o- and e-beams. In spite of the fact that the aforementioned e-beam and the o-beam have the same directions of wave vectors, their energies propagate at a small angle to each other. This factor influences only the linear geometric dimensions of the prism and for better understanding can be ignored in consideration of the principle of the invention.

In point R the aforementioned e-beam and o-beam are reflected under the condition of total internal reflection at different angles between their respective wave vectors.

The reflected o-beam 154 obeys a known rule stating that the incidence and reflection angles are equal, but this trivial rule does not hold for the e-beam 152. This latter beam obeys the generalized Snell law under which the refraction indices are functions of the angles. An appropriate equation that describes the e-beam reflection in an optically uniaxial crystal is as follows:

$$N_{ie} \cdot \sin(\alpha_i) = N_{re} \cdot \sin(\alpha_r). \tag{1}$$

Here incidence angles ($\alpha_i$ and $\alpha_r$ and e-beam refraction indices $N_{ie}$ and $N_{re}$ correspond to the aforementioned beams prior to reflection (subscript i) and after reflection (subscript r), respectively. It can be seen from FIG. 4 that angle $\alpha_1$ between the first base plane and the second base plane is equal to angle $\alpha_i$ between the perpendicular to the second base plane 160 and the incidence beam 150. Angle $\alpha_o$ of o-beam reflection is equal to angle $\alpha_i$, and hence to $\alpha_1$. Angle $\delta$ is an angle inside the prism between wave vectors of the e- and o-beams after reflection from the second base plane 160. According to FIG. 4, for a uniaxial crystal the equation (1) can be expanded to $$N_o \cdot N_e \cdot [N_o^2 \cdot \sin^2(v - \alpha_i) + N_e^2 \cdot \cos^2(v - \alpha_i)]^{-1/2} \cdot \sin(\alpha_i) =$$
$$= N_o \cdot N_e \cdot [N_o^2 \cdot \sin^2(v + \alpha_o + \delta) + N_e^2 \cdot \cos^2(v + \alpha_o + \delta)]^{-1/2} \cdot \sin(\alpha_o + \delta) \tag{2}$$

As can be seen from FIG. 4, here $\alpha_i = \alpha_o = \alpha$, and angle $\delta < 0$.

In equation (2), for a uniaxial crystal, v is an angle of orientation of the optical axis with respect to the perpendicular to the second base plane 160. The angle v is measured from the aforementioned perpendicular in a counterclockwise direction towards the optical axis. It should be noted that the angle $\delta$ between wave vectors of the beams is considered positive if the angle of reflection of the e-beam exceeds that of the o-beam. The angle $\delta$ between wave vectors of the beams is considered negative if the angle of reflection of the e-beam is smaller than that of the o-beam. In formula (2), $N_e$ and $N_o$ are main refraction indices of the e-beam and o-beam, respectively.

Figure 5:
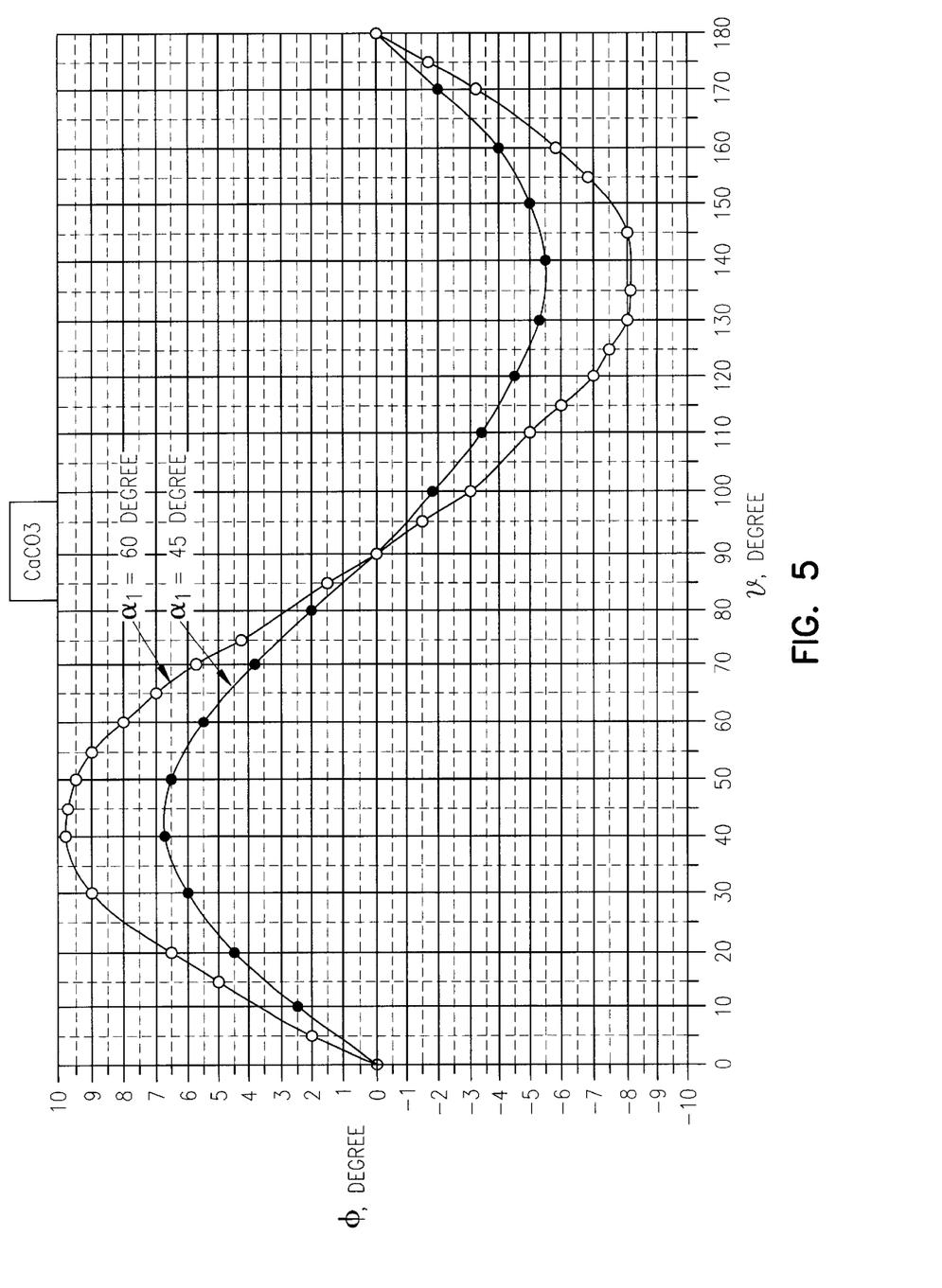
FIG. 5 is a graph illustrating effect of selection of the angle of incidence and orientation of optical axis in calcite on increase in angle of beam separation for two angles of incidence.

Solutions of this equation for a uniaxial calcite crystal ($CaCO_3$) are illustrated in FIG. 5 by plots of separation angle $\delta$ as a function of incidence angle $\alpha$ and optical axis orientation v. Analysis of these curves shows that, in order the reflection angle $\alpha_r$ (FIG. 4) of the e-beam be smaller than the reflection angle $\alpha_o$ of the o-beam, the orientation of the optical axis should be selected so that the angle v corresponds to negative values of the angle $\delta$.

After total internal reflection from the second base plane 160, the o-beam 154 exits the prism 156 through the fifth base plane 166 along the normal to the plane 166.

After total internal reflection from the second base plane 160, the e-beam 152 falls (as before we consider only the wave vectors of beams) on the third base plane 162, wherefrom it is reflected with the total internal reflection and exits the prism 156 through the fourth base plane 164 along the normal to this plane 164.

It should be noted the incidence angle $\alpha^*_i$ of the e-beam onto the third base plane 162 is equal to the reflection angle $\alpha_r$ of the same beam from the second base plane 160. It can be seen from FIG. 4, that $\alpha_r = \alpha_o + \delta$, where $\delta < 0$. Furthermore, irrespective of the points R and M, the angle $\alpha_a$ between the e-beam and the optical axis 168 remains unchanged. This is obvious from geometrical relationships shown in FIG. 4. Therefore, the e-beam will be reflected from the third base plane 162 in the point M at a reflection angle equal to the angle $\alpha_i$ of incidence of the beam 150 on the second base plane ($\alpha_i = \alpha_I$).

From the foregoing, it can be concluded that, irrespective of the wavelength of the incident light, parallelism between the second and third base planes provides that the e-beam 152 is always reflected from the third base plane 162 in a direction parallel to the incident beam 150.

Since after reflection from the third base plane 162 the e-beam 152 exits the prism 156 through the fifth base plane 164 along the normal to this plane, and the o-beam 154 exits the prism 156 through the fourth base plane 166 along the normal to the plane 166, the angle $\Delta$ between these beams in air also will not depend on the wavelength of the incident light beam 150 and will be determined exclusively by the selection of angle oft between the first base plane 158 and the second base plane 160. The angle $\Delta$ will be equal to $\Delta = (180° - 2\alpha_I)$. Thus $\alpha_I = (180° - \delta)/2$.

With reference to the uniaxial or biaxial crystals, it should be noted that the invention relates to crystals of both these types. However, in the case of a uniaxial crystals, it should be noted that the crystal of this type has only one optical axis, which fully determines optical orientation of the crystal. The meaning of the optical orientation consists in that a value of the refraction index for the e-beam is unequivocally determined by the angle between the direction of the e-beam and the aforementioned optical axis. In the case of biaxial crystals the picture becomes more complicated. This is because the biaxial crystal has three main sectional planes of optical indicatrix having so called axes of the optical indicatrix ($N_x = N_{min}$, $N_y = N_{mean}$, and $N_y = N_{max}$, where $N_x$, $N_y$, and $N_z$ are main values of refraction indices along axes X, Y, and Z, respectively, and where "min" designates "minimal", "mean" designates an average, and "max" designates "maximal"). The plane of propagation of the incident and reflected beams may coincide with any of the aforementioned three main section planes. Therefore, in the case of a biaxial crystal, first it is necessary to select one plane of propagation of the beams. This plane must coincide with one main section plane of the optical indicatrix.

More specifically, for a biaxial crystal this condition can be expressed as follows:

$$N_{e1} \cdot N_{e2} \cdot [N_{e1}^2 (v - \alpha_i) + N_{e2}^2 \cdot \cos^2(v - \alpha_i)]^{-1/2} \cdot \sin(\alpha_i) =$$
$$= N_{e1} \cdot N_{e2} \cdot [N_{e1}^2 \cdot \sin^2(v + \alpha_o + \delta) + N_{e2}^2 \cdot \cos^2(v + \alpha_o + \delta)]^{-1/2} \cdot \sin(\alpha_o \delta) \tag{2a}$$

In this equation, for a biaxial crystal, $N_{e1}$ and $N_{e2}$ are selected from the aforementioned $N_{min}$, $N_{mean}$, and $N_{max}$ in an appropriate selected main section of the optical indicatrix, whereas ($v - \alpha_i$) is an angle between the incident beam 150 and one of the axes of the indicatrix in the selected section. More specifically, ($v - \alpha_i$) is the angle between the axis that corresponds to $N_{e1}$ and the incident beam 150. The angle ($v + \alpha_o + \delta$) is an angle between the reflected e-beam and one of the axes of the indicatrix in the selected section. More specifically, ($v + \alpha_o + \delta$) is the angle between the axis that corresponds to $N_{e1}$ and the reflected e-beam.

Thus, in each main section of the optical indicatrix, the reflection of the e-beam can be interpreted as reflection in the case of a uniaxial crystal, in which the role of the optical axis is fulfilled by one of the selected axes of the optical indicatrix.

Selection of the prism parameters for prism manufacturing is usually determined by specific application requirements such as dimensions of the beam cross section and the required angle $\Delta$ of separation of the e-beam and o-beam in air. Since, as has been mentioned above and shown in FIG.

4, $\Delta=(180°-2\alpha_I)$, other angles of the prism can be unequivocally determined as follows:

$\beta_I=\alpha_I$
$\gamma_I=\beta_I$
$\psi_I=\beta_I$
$\phi_I=540°-(\alpha_I+\beta_I+\gamma_I+\psi_I)$.

Thus, all angular characteristics of the prism of the invention are determined entirely by the selection of angle of incidence $\alpha_I$, which in turn depends on the selection of the given angle $\Delta$.

Figure 6:
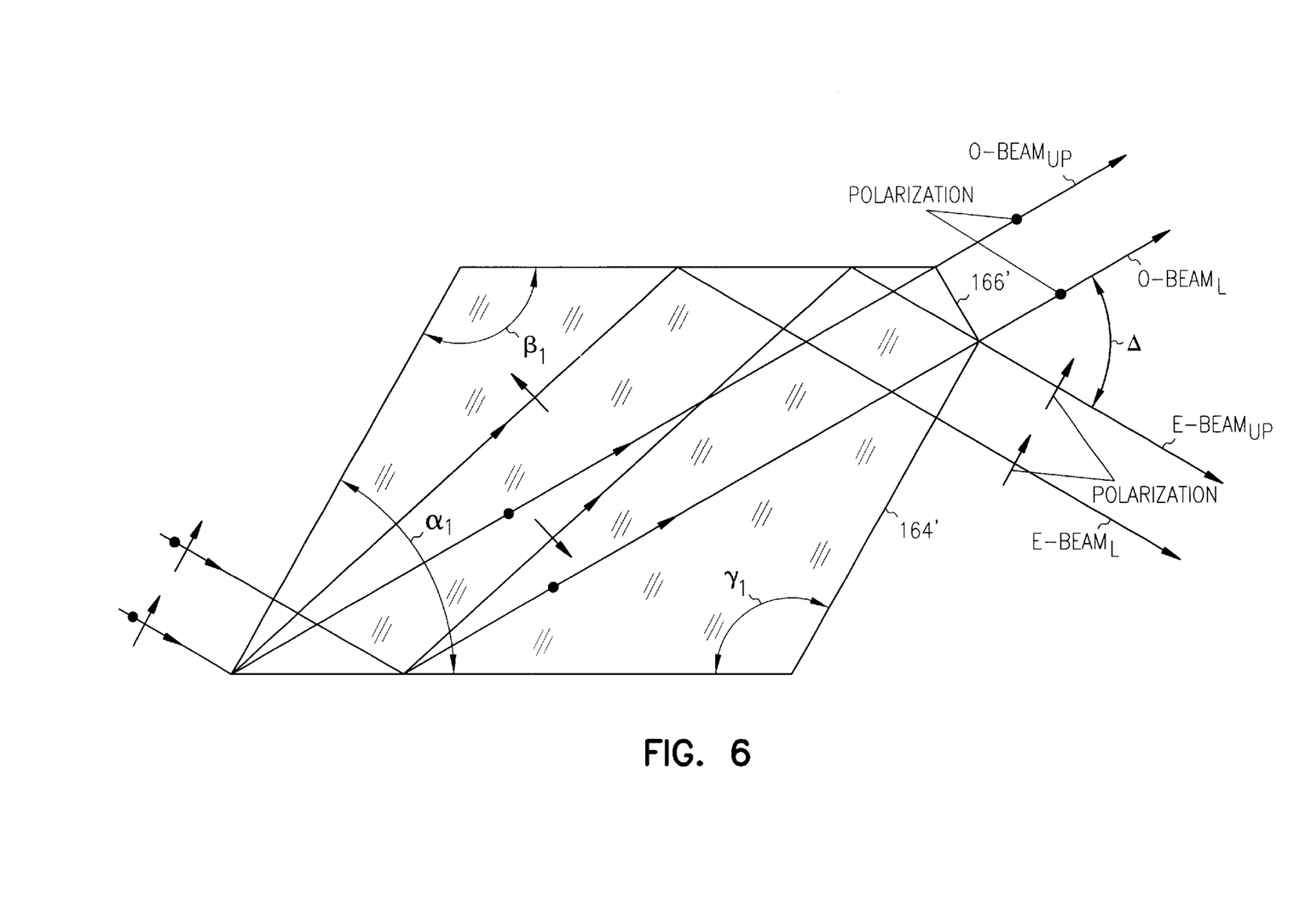
FIG. 6 is one of an approximate practical forms of the prism of the invention illustrating selection of prism parameters for the $CaCO_3$ crystal prism with the minimal possible dimensions.

FIG. 6 is the example of approximate proportional practical form of the $CaCO_3$ prism of the invention illustrating selection of prism parameters for a prism: $\alpha_I\equiv55°$, $\psi_I=\gamma_I=\beta_I\equiv$, 125°, $\phi_I=110°$, v115°(for$\lambda=1060$nm). The angles $\alpha_I$ and v were selecting from the condition of the maximum angle between the Poynting vectors of the o-beam and e-beam after reflection from the second base plane 160 (FIG. 4). Such choice ensures the minimal prism dimensions, although it's not always necessary.

As can be seen from this drawing, in the prism with minimal possible dimensions, the lower marginal o-beam$_L$ (the Poynting vector) exiting the prism through the fifth base plane 166' and the upper marginal e-beam$_{UP}$ (the Poynting vector) exiting the prism through the fourth base plane 164' intersect in point S which is the edge of the prism formed by intersection of base planes 166' and 164'.

The prism of the invention is manufactured by the method described below.

The following input parameters are known from the application conditions and design requirements: cross sectional dimensions of the beams and angle of separation of the e-beam and o-beam in air. Other angular and linear parameters, including the height "h" and the lengths of all the base planes of the prism, are calculated based on the values of angles $\alpha_I$, v, $\delta$, cross sectional dimension of the incident, and if necessary, the aforementioned condition for selection of the prism of the minimal dimensions.

First a material suitable for the prism of the invention, i.e., an appropriate uniaxial crystal material or a biaxial crystal material is selected from the optical anizotropic crystals mentioned above.

The next step is determining the orientation of the optical axis for a single-axis crystals and of the axes of the optical indicatrix for biaxial crystals with respect to normal to the plane of total internal reflection for o- and e-beams. The orientation of the optical axis should be selected so that the angle v corresponds to negative values of the separation angle $\delta$. If necessary, in order to obtain a prism of minimal possible dimensions, one can use a criterion of the maximum angle between the Poynting vectors of the o-beam and e-beam after reflection from the second base plane 160 (FIG. 4) ensuring the minimal prism dimensions.

The next step is calculation of angle $\delta$ between the wave vectors by the aforementioned formulae for total internal reflection.

The next step is calculation of separation angle between the Poynting vectors by the procedures well known to those skilled in the are and described, for example, in *Handbook of Optics, Vol. II, Devices Measurements and Properties*, McGraw-Hill, Inc., 1995, pp. 3.1–3.70, New York, San Francisco, Montreal, Tokyo, Toronto.

The height "h" is then calculated by trigonometric formulae with the use of the obtained separation angle of the Poynting vectors, given angle $\alpha_I$ and the size of the beam cross section in the plane of the drawing of FIG. 4. All the angular and linear parameters of the prism must satisfy the main requirement of the prism, i.e., an even number of total internal reflections of the e-beam inside the prism.

After calculations and orientation of the prism crystal, two parallel base planes 160 and 162 (FIG. 4) are formed. The next step is forming the first base plane 158 and the fourth base plane 164 parallel thereto (FIG. 4). The fifth base plane 166 (FIG. 4) is formed by cutting the angle formed by the third and fourth base planes. The fifth plane is formed at such a distance from the apex formed by the intersection of the third and fourth base planes that automatically produces calculated lengths of the third and fourth base planes. It is understood that all of the base planes are formed by appropriate cutting and polishing to the optical quality. It is also understood that the first, fourth, and fifth base planes of the prism are coated with an antireflective coatings.

Thus it is has been shown that the single-crystal two-beam polarization prism of the invention is free of wavelength dispersion of the beam separation angle in air, does not distort the cross section of the beams, and combines the aforementioned features with minimal optical losses. The invention also provides a method of manufacturing the aforementioned prism.

Although the invention has been shown and described with reference to specific embodiments, it is understood that these embodiments should not be construed as limiting the fields of application of invention and that any changes and modifications with regard to the shapes and materials are possible without departure from the scope of the attached patent claims. For example, the prism may have six or more facets obtained by cutting the unused angles $\beta_I$, and $\gamma_I$ (FIG. 6). The prism may have angles between the facets variable depending on the given. Linear dimensions of the prism are not necessarily obey the condition of dimension minimization and may be arbitrarily increased. The prism can be made from materials other than those listed in the description. The prism of FIG. 6 can be combined with any other optical elements which allow to change direction of the beams as required by a specific application. For example, the fifth base plane through which the o-beam exits the prism can be made in the form of a totally-reflective or semi-transparent mirror so that the o-beam can be reflected back into the prism up to the first base plane and then exit the prism through the second base plane along its normal or substantially close to the normal after reflection from the first base plane.

What is claimed:

1. A single crystal two-beam polarizing prism without angular dispersion for polarization of a non-polarized incident beam entering said prism and dividing said non-polarized incident beam into two orthogonally polarized beans separated in air at a given angle $\Delta$, said prism comprising:

at least five base planes with two pairs of base planes mutually parallel within each pair, said at least five base planes comprising
a first base plane;
a second base plane;
a third base plane;
a fourth base; and
a fifth base plane,
said first base plane and said fourth base plane being parallel to each other;
said second base plane and said third base plane being parallel to each other;
when said incident beam entering said prism through said first base plane, said incident beam being divided inside said prism into o-beam and an e-beam so that said o-beam exits said prism through said fifth base plane along a normal to said fifth base plane, and said e-beam exits said prism through said fourth base plane along a normal to said fourth base plane, said e-beam being reflected inside said prism with even number of total internal reflections.

2. The prism of claim 1, wherein said first base plane and said second base plane form a first angle $\alpha_I$, said first base plane and said third base plane form a second angle $\beta_I$, said second base plane and said fourth base plane form a third angle $\gamma_I$, said third base plane and said fifth base plane form a fourth angle $\psi_I$, and said fourth base plane and said fifth base plane form a fifth angle $\phi_I$ which is calculated from the following formula:

$$\phi_I = 540 - (\alpha_I + \beta_I + \gamma_I + \psi_I),$$

where $\alpha_I = (180° - \Delta)/2$, $\beta_I = (180° - \alpha_I)$, $\gamma_I = \beta_I$, and $\psi_I = \beta_I$.

3. The prism of claim 2, wherein the number of reflections of o-beam inside the prism is arbitrary.

4. The prism of claim 3, wherein said prism is produced from a birefringent optical single crystal.

5. The prism of claim 3, wherein normals to said first base plane, said second base plane, said third base plane, and said fourth base plane are coplanar.

6. The prism of claim 3, wherein said first base plane and said fourth base plane are coated with an anti-reflective coating.

7. The prism of claim 1, wherein said prism is produced from a birefringent optical single crystal.

8. The prism of claim 1, wherein normals to said first base plane, said second base plane, said third base plane, and said fourth base plane are coplanar.

9. The prism of claim 1, wherein said first base plane and said fourth base plane are coated with an anti-reflective coating.

10. A method of manufacturing a single crystal two-beam polarizing prism without angular dispersion for polarization of a non-polarized incident beam entering said prism and dividing said non-polarized incident beam into two orthogonally polarized beams separated in air at a given angle $\Delta$, said incident beam is characterized by a dimension of cross section thereof, said method comprising the steps of:

selecting an optical birefringent crystal for manufacturing said prism from uniaxial and biaxial crystals, said uniaxial crystal being characterized by an optical axis, and said biaxial crystals being characterized by the three axes of the optical indicatrix, said indicatrix having three main section planes, each of said main section planes being formed by two of said three axes, said prism having a first base plane, a second base plane, a third base plane, a fourth base, and a fifth base plane, said first base plane and said fourth base plane being parallel to each other, said second base plane and said third base plane being parallel to each other, said first base plane and said second base plane forming a first angle $\alpha_I$, said first base plane and said third base plane forming a second angle $\beta_I$, said second base plane and said fourth base plane forming a third angle $\gamma_I$, said third base plane and said fifth base plane forming a fourth angle $\psi_I$, and said fourth base plane and said fifth base plane forming a fifth angle $\phi_I$ which is calculated from the following formula:

$$\phi_I = 540 - (\alpha_I + \beta_I + \gamma_I + \psi_I),$$

where $\alpha_I = (180° - \Delta)/2$, $\beta_I = (180° - \alpha_I)$, $\gamma_I = \beta_I$, and $\psi_I = \beta_I$.

when said incident beam entering said prism through said first base plane, said incident beam being divided inside said prism into o-beam and an e-beam so that said o-beam exits said prism through said fifth base plane along a normal to said fifth base plane, and said e-beam exits said prism through said fourth base plane along a normal to said fourth base plane, said e-beam being reflected inside said prism with even number of total internal reflections;

determining orientation of said optical axis for said uniaxial crystal and said three axes of the optical indicatrix for said biaxial crystals with respect to a normal to said second base plane;

calculating angular and linear parameters of said prism from a given value of said angle $\Delta$ and said dimension of cross section, said angular and linear parameters including at least lengths of said first base plane, said second base plane, said third base planes and said angles $\alpha_I$, $\beta_I$, $\gamma_I$, and $\psi_I$, forming said second base plane and said third base plane parallel to each other at a distance based on said angles and lengths;

forming said first base plane and said fourth base plane parallel to each other at a distance based on said angles and lengths; and forming said fifth base plane at such a distance from the apex formed by the intersection of said third base plane and said fourth base plane that automatically produces calculated lengths of said the third base plane and said fourth base planes.

11. The method of claim 10, wherein said steps of forming comprises cutting and polishing to the optical quality.

12. The method of claim 11, further comprising the step of coating said first base plane, said fourth base plane, and said fifth base plane with antireflective coatings.

13. The method of claim 12, wherein said prism has a thickness which is equal to or greater than said dimension of cross section.

14. The method of claim 10, wherein said prism has a thickness which is equal to or greater than said dimension of cross section.

* * * * *